United States Patent [19]

Schwan

[11] Patent Number: 4,614,944

[45] Date of Patent: Sep. 30, 1986

[54] TELEMETRY SYSTEM FOR DISTRIBUTED EQUIPMENT CONTROLS AND EQUIPMENT MONITORS

[75] Inventor: Herbert A. Schwan, Encinitas, Calif.

[73] Assignee: Teleplex Corporation, San Diego, Calif.

[21] Appl. No.: 758,565

[22] Filed: Jul. 24, 1985

Related U.S. Application Data

[63] Continuation of Ser. No. 428,545, Sep. 30, 1982, abandoned.

[51] Int. Cl.[4] .................................... H04Q 9/00

[52] U.S. Cl. .................... 340/825.06; 340/825.11; 340/825.68

[58] Field of Search .................... 340/825.06, 825.07, 340/825.65, 825.68, 825.1, 870.13, 870.14, 825.11

[56] References Cited

U.S. PATENT DOCUMENTS

| | | | |
|---|---|---|---|
| 3,588,825 | 6/1971 | Shook et al. | 340/163 |
| 3,636,525 | 1/1972 | Inaba et al. | 340/172.5 |
| 3,641,326 | 2/1972 | Harte | 235/151.11 |
| 3,668,653 | 6/1972 | Fair et al. | 340/172.5 |
| 3,748,647 | 7/1973 | Ashany et al. | 370/86 |
| 3,821,480 | 6/1974 | Dundon et al. | 370/112 |
| 3,876,984 | 4/1975 | Chertok | 340/152 |
| 3,883,851 | 5/1975 | Drake et al. | 340/172.5 |
| 3,904,829 | 9/1975 | Martin et al. | 370/86 |
| 4,027,301 | 5/1977 | Mayer | 370/112 |
| 4,042,783 | 8/1977 | Gindi | 370/86 |
| 4,068,297 | 1/1978 | Komiya | 364/107 |
| 4,069,488 | 1/1978 | Fiorenza et al. | 364/474 |
| 4,100,597 | 7/1978 | Fleming et al. | 364/474 |
| 4,104,731 | 8/1978 | Grudowski | 364/900 |
| 4,109,309 | 8/1978 | Johnstone et al. | 364/120 |
| 4,114,138 | 9/1978 | Demers | 340/825.65 |
| 4,121,284 | 10/1978 | Hyatt | 364/200 |
| 4,122,519 | 10/1978 | Bielawski et al. | 364/200 |
| 4,132,981 | 1/1979 | White | 340/203 |
| 4,150,326 | 4/1979 | Engelberger et al. | 318/563 |
| 4,154,983 | 5/1979 | Pedersen | 370/89 |
| 4,162,519 | 7/1979 | Hanewinkel | 364/200 |
| 4,209,840 | 6/1980 | Beradi et al. | 364/200 |
| 4,251,858 | 2/1981 | Cambigue et al. | 340/825.17 |
| 4,293,948 | 10/1981 | Soderblom | 370/86 |
| 4,298,860 | 11/1981 | Norberg et al. | 340/825.04 |
| 4,342,985 | 8/1982 | Desjardins | 340/825.1 |
| 4,354,267 | 10/1982 | Mori et al. | 340/825.01 |
| 4,356,485 | 10/1982 | Boschulte et al. | 340/825.17 |
| 4,366,479 | 12/1982 | Mori et al. | 370/86 |
| 4,413,341 | 11/1983 | Markhasin et al. | 340/825.07 |

*Primary Examiner*—Donald J. Yusko
*Attorney, Agent, or Firm*—Edward W. Callan

[57] ABSTRACT

A telemetry system for a plurality of distributed equipment controls and/or equipment monitors that does not require complex masses of wires. The telemetry system includes an output channel for communicating control signals to the equipment controls and/or an input channel for communicating monitored signals from the equipment monitors. The output channel includes a first block of transmitter register stages for receiving a set of control signals from a controller; and a second block of distributed, series-connected parallel-output control register stages connected in series with the first block for receiving the control signals in series from the first block, and respectively positioned at the equipment controls for connection to the equipment controls for providing the control signals to the equipment controls. The input channel includes a third block of distributed series-connected parallel-input monitor register stages respectively positioned at the equipment monitors for connection to the equipment monitors for receiving a set of monitored signals from the equipment monitors; and a fourth block of receiver register stages connected in series with the third block for receiving the monitored signals in series from the third block. Signal transfer to the intended register stages is solely in response to a clock signal consisting of a series of clock pulses and a frame pulse for defining each frame of the clock signal.

21 Claims, 18 Drawing Figures

FIG. 4
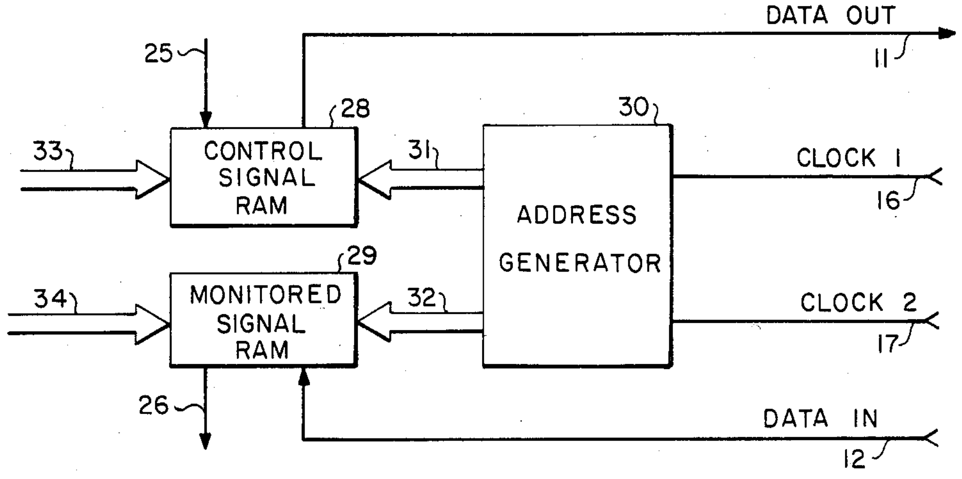
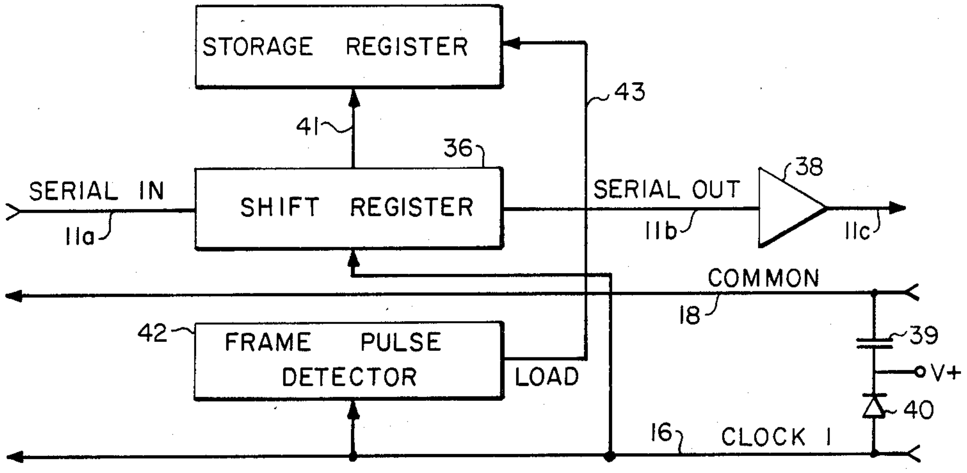
FIG. 5
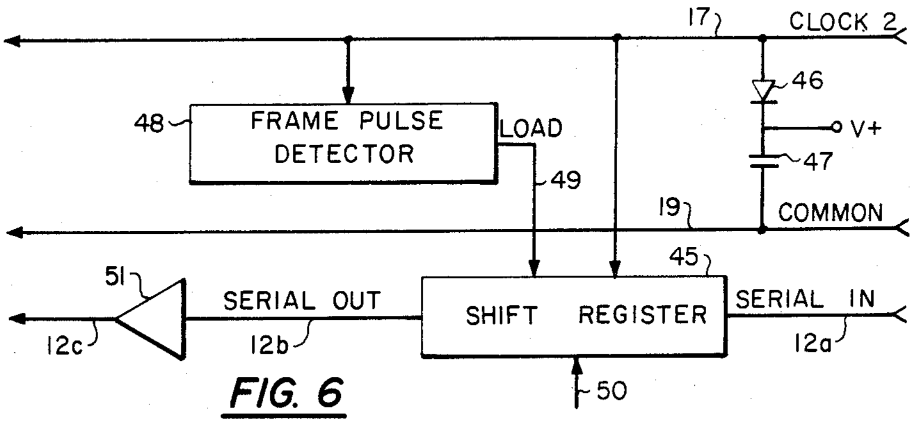
FIG. 6

TELEMETRY SYSTEM FOR DISTRIBUTED EQUIPMENT CONTROLS AND EQUIPMENT MONITORS

This is a continuation of co-pending application Ser. No. 428,545 filed on Sept. 30, 1982, now abandoned.

BACKGROUND OF THE INVENTION

The present invention generally pertains to telemetry systems and is particularly directed to an improved telemetry system for distributed equipment controls and equipment monitors.

As used herein the term telemetry system means a system for communicating control signals to equipment controls that are physically remote from the source of the control signals and/or a system for communicating monitored signals from equipment monitors that are physically remote from the receivers of the monitored signals. Many telemetry systems are used with remotely located computers which provide the control signals and receive the monitored signals.

Completing the communications links between the computer and the equipment controls and/or equipment monitors often requires complex masses of individual wires connecting each equipment control and/or equipment monitor to the computer. Such wiring is expensive to design, difficult to troubleshoot, and costly and time consuming to purchase and to install. A need to accomodate masses of wires on or within the structure of a equipment system often influences and restricts the design of the system.

Two prior art methods are available for the reduction of the complexity of interconnections in electrical equipment. These are frequency-division multiplexing and time-division multiplexing.

In frequency-division multiplexing, each signal to be communicated modulates a carrier at a unique frequency. The modulated carriers are then combined for transmission over a single wire pair or radio channel. At the receiving end, conventional frequency separation and demodulation techniques are used to separate the signals.

In time-division multiplexing, a single wire set is used to communicate a plurality of individual signals or signal sets by switching the wire set among the signal sources according to some prearranged time schedule or in accordance with prearranged, special commands. Complementary switching at the receiver directs the signals to their assigned destinations.

SUMMARY OF THE INVENTION

The present invention is a novel telemetry system for a plurality of distributed equipment controls and/or equipment monitors that does not require complex masses of wires. The telemetry system of the present invention includes an output channel for communicating control signals to the equipment controls and/or an input channel for communicating monitored signals from the equipment monitors. The output channel includes a first block of transmitter register stages for receiving a set of control signals from a controller; and a second block of distributed series-connected parallel-output control register stages connected in series with the first block for receiving the control signals in series from the first block, and respectively positioned at the equipment controls for connection to the equipment controls for providing the control signals to the equipment controls. The input channel includes a third block of distributed series-connected parallel-input monitor register stages respectively positioned at the equipment monitors for connection to the equipment monitors for receiving a set of monitored signals from the equipment monitors; and a fourth block of receiver register stages connected in series with the third block for receiving the monitored signals in series from the third block. The telemetry system of the present invention thereby also is less complex than the prior art systems employing multiplexing techniques. Signal transfer to the intended register stages is solely in response to a clock signal consisting of a series of clock pulses and a frame pulse for defining each frame of the clock signal.

A register stage is considered to be positioned at an equipment control (or equipment monitor) when it is positioned within a practical distance thereof. For example, when communicating with equipment within a nuclear reactor the register stages necessarily are positioned a considerable distance therefrom to avoid interference from radiation.

A further reduction in the number of wires required may be obtained by superimposing a clock signal for each channel with the power signal for each channel on a single line.

Another technique for reducing the number of wires is to provide a single clock signal over a single line for both the output channel and the input channel.

The number of wires required can be reduced still further by alternatively switching the control and monitor register stages into respective series connections with a single data line to enable bidirectional signal flow for alternatively communicating the control signals and the monitored signals over the single data line.

The telemetry system for the present invention is particularly useful for interfacing programmable controllers and both large and small computers, including minicomputers, with distributed equipment controls and equipment monitors.

Elaboration of the foregoing features and additional features of the present invention are described in relation to the description of the preferred embodiment.

BRIEF DESCRIPTION OF THE DRAWING

FIG. 4 is a diagram of an alternative preferred embodiment of the transceiver in the telemetry system of FIG. 1.

FIG. 5 is a block diagram of a control register stage in combination with a storage register in the telemetry system of FIG. 1.

FIG. 6 is a block diagram of a monitor register stage in the telemetry system of FIG. 1.

DESCRIPTION OF THE PREFERRED EMBODIMENTS

Figure 1:
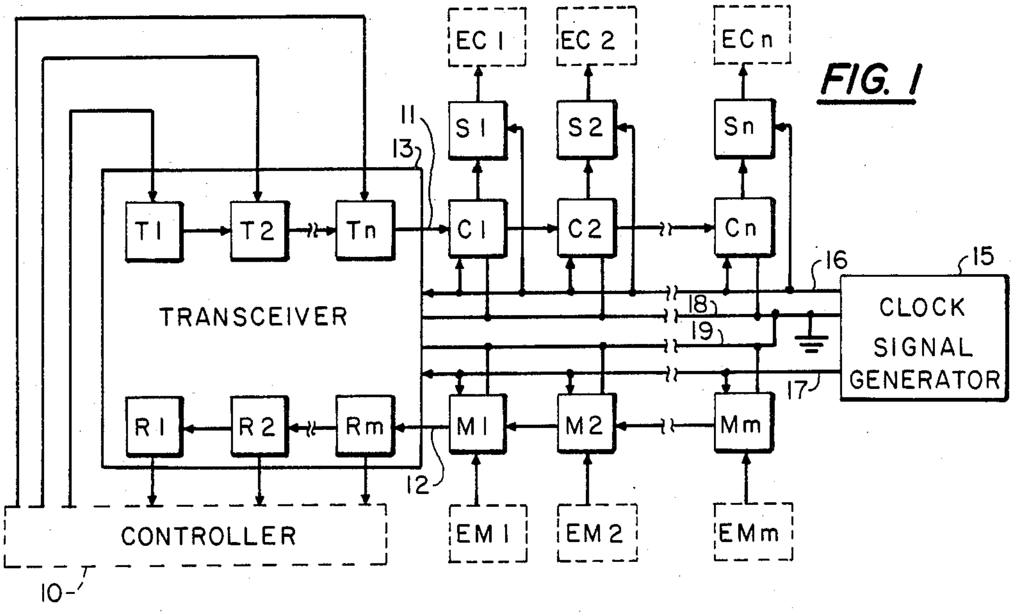
FIG. 1 is a block diagram of a preferred embodiment of the basic telemetry system of the present invention.

Referring to FIG. 1, a preferred embodiment of the telemetry system of the present invention includes an output channel for communicating control signals from a controller 10, such as a computer, to equipment controls EC1, EC2, . . . ECn and an input channel for communicating monitored signals from equipment monitors EM1, EM2, . . . EMm to the controller 10.

The output channel includes a block of transmitter register stages T1, T2, . . . Tn, a block of n series-connected parallel-output control register stages C1, C2, . . . Cn, and a set of storage registers S1, S2, . . . Sn. "n" is an integer greater than one. The transmitter register stages T1, T2, . . . Tn are connected to the controller 10 for receiving a set of control signals therefrom. The block of control register stages C1, C2 . . . Cn is connected in series with the block of transmitter register stages T1, T2, . . . Tn for receiving the control signals in series over a data line 11. The control register stages C1, C2, . . . Cn are respectively positioned at the equipment controls EC1, C2 . . . Cn for connection to the equipment controls for providing the control signals thereto. The storage registers S1, S2, . . . Sn are respectively connected between the control register stages C1, C2, . . . Cn and the equipment controls EC1, EC2, . . . ECn for storing the control signals.

The input channel includes a block of m seriesconnected parallel-input monitor register stages M1, M2, . . . Mm and a block of receiver register stages R1, R2, . . . Rm. "m" is an integer greater than one. The monitor register stages M1, M2, . . . Mm are respectively positioned at the equipment monitors EM1, EM2, . . . EMm for connection to the equipment monitors for receiving monitored signals therefrom. The block of receiver register stages R1, R2, . . . Rm is connected in series with the block of monitor register stages M1, M2, . . . Mm for receiving the monitored signals in series over data line 12 therefrom.

The transmitter register stages T1, T2, . . . Tn and the receiver register stages R1, R2, . . . Rm are contained in a single transceiver unit 13.

The system further includes a clock signal generator 15. The clock signal generator 15 provides first and second clock signals on lines 16 and 17 respectively. The clock signals are superimposed on a power signal for the telemetry system. Lines 18 and 19 are common power signal lines connecting the components of the telemetry system to a common voltage reference source, such as circuit ground. The first and second clock signals each have a series of clock pulses and a frame pulse for defining each frame of the clock signal. Accordingly, the output channel and input channel each may include as few as three lines. The output channel includes data line 11, clock/power line 16 and common line 18; and the input channel includes data line 12, clock/power line 17 and common line 19.

The control register stages C1, C2, . . . Cn are connected for operation as a shift register; and the monitor register stages M1, M2, . . . Mm are connected for operation as a shift register.

The clock signal generator 15 is coupled to the stages of the output channel by line 16 for shifting a set of control signals in series over data line 11 from the block of transmitter register stages T1, T2, . . . Tn to the block of control register stages C1, C2, . . . Cn in response to the clock pulses during each frame of the first clock signal.

The clock signal generator 15 is coupled to the stages of the input channel by line 17 for shifting a set of monitored signals in series over data line 12 from the block of monitor register stages M1, M2, . . . Mm to the block or receiver register stages R1, R2, . . . Rm in response to the clock pulses during each frame of the second clock signal.

The storage registers S1, S2, . . . Sn are coupled to the clock signal generator 15 to respond to each frame pulse in the first clock signal on line 16 by receiving and storing each set of control signals from the stages of the control register stages C1, C2, . . . Cn for provision to the equipment controls EC1, EC2, . . . ECn.

The number of clock pulses in each frame of the respective first and second clock signals depends upon the respective numbers of control register stages C1, C2, . . . Cn and monitor register stages M1, M2, . . . Mm in the output and input channels. When the number of control register stages C1, C2, . . . Cn is approximately the same as the number of monitor register stages M1, M2, . . . Mm, a single clock signal may be utilized for clocking the shifting of control signals and monitored signals in the output and input channels respectively. Such an embodiment is shown in FIG. 2.

Figure 2:
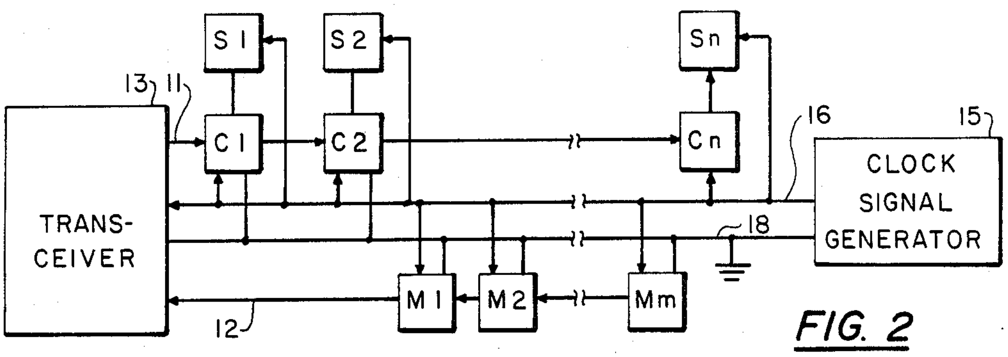
FIG. 2 is a block diagram of an alternative preferred embodiment of the telemetry system of the present invention.

The telemetry system of FIG. 2 utilizes the same components as the telemetry system of FIG. 1, except that the clock signal generator 15 provides a single clock signal on line 16 superimposed on a power signal for the telemetry system, and only a signel common line 18 is used to connect the components of the telemetry system to a common voltage reference source, such as circuit ground. It is seen that the telemetry system of FIG. 2 may include as few as four lines in the inpout and output channels combined, to wit: output data line 11, input data line 12, clock/power line 16 and common line 18. The order in which the respective control register stages C1, C2, . . . Cn and monitor register stages M1, . . . Mm are positioned in relation to each other is dependent upon the relative positions of the respective equipment controls and equipment monitors to which such register stages are connected. The order shown in FIG. 2 is merely exemplary.

In the embodiment of FIG. 2, the control register stages C1, C2, . . . Cn are connected for operation as a shift register and the monitor register stages M1, M2, . . . Mm are connected for operation as a shift register.

The clock signal generator 15 provides a clock signal on line 16 having a series of clock pulses and a frame pulse for defining each frame.

The clock signal generator 15 is coupled to the stages of the output channel by line 16 for shifting a set of control signals in series over data line 11 from the block of transmitter register stages T1, T2, . . . Tn to the block of control register stages C1, C2, . . . Cn in response to the clock pulses during each frame of the clock signal.

The clock signal generator 15 is coupled to the stages of the input channel by line 16 for shifting a set of monitored signals in series over data line 12 from the block of monitor register stages M1, M2, . . . Mm to the block of receiver register stages R1, R2, . . . Rm in response to the clock pulses during each frame of the clock signal.

The storage registers S1, S2, . . . Sn are respectively connected between the control register stages C1, C2, . . . Cn and the equipment controls EC1, EC2, . . . ECn for storing the control signals. The storage registers S1, S2, . . . Sn are coupled to the clock signal generator 15 to respond to each frame pulse in the clock signal by receiving and storing each set of control signals from the control register stages C1, C2, . . . Cn for provision to the equipment controls EC1, EC2, . . . ECn.

Figure 3:
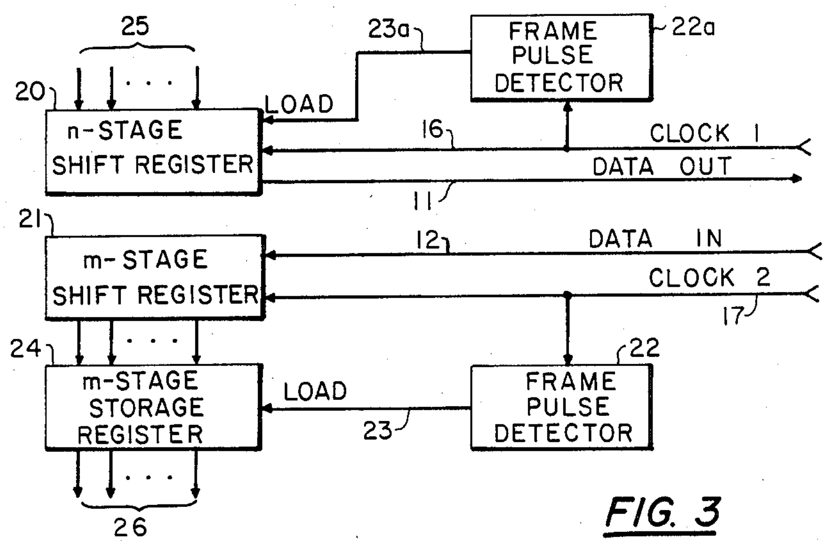
FIG. 3 is a block diagram of one preferred embodiment of the transceiver in the telemetry system of FIG. 1.

A preferred embodiment of the transceiver unit of FIG. 1 is shown in FIG. 3. The block of transmitter register stages is embodied in an n-stage shift register 20; and the block of receiver register stages is embodied in an m-stage shift register 21. The n-stage shift register 20 provides the control signals in series over data output line 11 to the control register stages C1, C2, . . . Cn in response to the clock pulses in the first clock signal received over line 16. The m-stage shift register 21 receives the monitored signals in series over data input line 12 from the monitor register stages M1, M2, . . . Mm in response to the clock pulses in the second clock signal received over line 17.

A frame pulse detector circuit 22 detects the frame pulse in the second clock signal on line 17 and provides a load control signal on line 23 to an m-stage storage register 24 in response to each frame pulse. A frame pulse detector circuit 22*a* detects the frame pulse in the first clock signal on line 16 and provides a load control signal on line 23*a* to the n-stage shift register 20. Control signals provided from the controller 10 via lines 25 are stored in the n-stage shift register 20 in response to each load control signal on line 23*a*. The monitored signals received by the m-stage shift register 21 are loaded in the m-stage storage register 24 in response to each load control signal on line 23.

The monitored signals stored in the m-stage shift register 24 are provided to the controller 10 via the lines 26.

In an alternative preferred embodiment shown in FIG. 4 of the transceiver in the telemetry system of FIG. 1, the transmitter register stages T1, T2, . . . Tn are embodied in a random access memory (RAM) 28; and the receiver register stages are embodied in a RAM 29. The RAM 28 stores control signals and the RAM 29 stores monitored signals.

In this embodiment, the transceiver 13 further includes an address generator 30. The address generator 30 is connected to the clock signal generator 15 via lines 16 and 17 for providing a first series of progressive address signals on lines 31 in response to the clock pulses in each frame of the first clock signal on line 16 and a second series of progressive address signals on lines 32 in response to the clock pulses in each frame of the second clock signal on line 17.

The address generator 30 is connected to the control signal RAM 28 for addressing the control signal RAM 28 with the first set of progressive address signals on lines 31 to serially retrieve a set of control signals from the RAM 28 for shifting such control signals in series over data output line 11 to the block of control register stages C1, C2, . . . Cn.

The address generator 30 is connected to the monitored signal RAM 29 for addressing the RAM 29 with the second set of progressive address signals on lines 32 to serially store a set of monitored signals shifted in series over data input line 12 from the block of monitor signal registers M1, M2, . . . Mm.

In accordance with the embodiment of FIG. 2, wherein only a single clock signal is provided by the clock signal generator 15, the address generator 30 responds to a single clock signal over line 16 to provide the first and second progressive address signals on lines 31 and 32.

The control signal RAM 28 stores control signals received from the controller 10 over line 25 in accordance with address signals provided on lines 33 from the controller 10. The monitored signal RAM 29 provides monitored signals over line 26 to the controller 10 in accordance with address signals provided on lines 34 from the controller 10. The controller 10 provides control signals (on lines not shown) to the transceiver 13 for controller whether the two RAM's 28 and 29 are addressed by the progressive address signals provided on lines 31 and 32 or by the address signals provided on lines 33 and 34 respectively. Read/Write control signals for the two RAM's 28 and 29 also are provided by the controller 10.

An alternative preferred embodiment of the transceiver 13 including a RAM for storing control signals and monitored signals and designed to enable the RAM to be accessed by a computer without interfering with communications between the RAM and the respective control register stages and monitor register stages is described in a co-pending U.S. patent application entitled "Buffer System for Interfacing an Intermittently Accessing Data Processor to an Independently Clocked Communications System" filed by Herbert Alan Schwan, the applicant herein and Eduard A. Schwan on even date herewith, the disclosure of which is incorporated herein by reference.

A preferred embodiment of a control register stage C in combination with a storage register S in the telemetry system of FIGS. 1 and 2 is shown in FIG. 5. The control register stage includes a series-input parallel-output one-bit shift register 36, a line driver 38, a capacitor 39 and a diode 40. The shift register 36 shifts a control signal on line 11$a$ to serial output line 11$b$ and to a parallel output line 41 in response to each clock pulse in the clock signal on clock/power line 16 from the clock signal generator 15. The line driver 38 conditions the control signal on line 11$b$ and provides the conditioned signal on data line 11$c$. A frame pulse detector 42 detects frame pulses in the clock signal on line 16 and responds to the detection thereof by providing a load control signal on line 43. The storage register S responds to the load control signal on line 43 by receiving and storing the control signal provided on parallel output line 41 from the shift register 36.

The capacitor 39 and diode 40 are connected in series between the common line 18 and the clock/power line 16 for separating the power signal for the control register stage C from the superimposed clock and power signals on line 16. The separated power signal is provided at terminal V+ at the junction of the capacitor 39 and the diode 40. This embodiment separates a DC power signal from a superimposed unipolar clock signal.

When a plurality of equipment controls are conveniently located together, a multiple bit shift register is preferred over the one-bit shift register 36. Each stage of the multiple-bit shift register has its parallel output coupled to a separate equipment control through a respective storage register.

A preferred embodiment of a monitor register stage M in the telemetry system of FIGS. 1 and 2 is shown in FIG. 6. The monitor register stage includes a series-input parallel-input one-bit shift register 45, a diode 46, a capacitor 47, a frame pulse detector circuit 48 and a line driver 51. The shift register 45 shifts a monitored signal on serial input line 12$a$ to serial output line 12$b$ in response to each clock pulse in the clock signal on clock/power line 17 from the clock signal generator 15. The line driver 51 conditions the monitored signal on line 12$b$ and provides the conditioned signal on data line 12$c$. The frame pulse detector 48 detects frame pulses in the clock signal on line 17 and responds to the detection thereof by providing a load control signal on line 49. The shift register 45 responds to the load control signal on line 49 by receiving a monitored signal provided to its parallel input on line 50. The capacitor 47 and the diode 46 are connected in series between the common line 19 and the clock/power line 17 for separating the power signal for the monitor register stage M from the superimposed clock and power signals on line 17. The separated power signal is provided at terminal V+ at the junction of the capacitor 47 and the diode 46. This embodiment separates a DC power signal from a superimposed unipolar clock signal.

Figure 7:
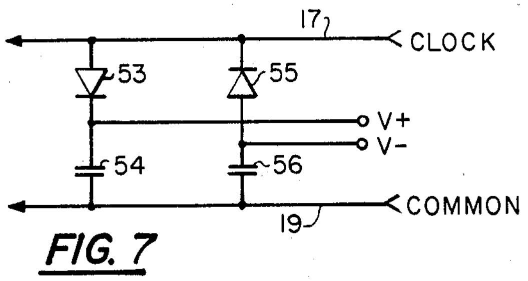
FIG. 7 is a schematic diagram of a circuit used for separating a DC power signal from a bipolar superimposed clock signal in a control (or monitor) register stage.

When a bipolar clock signal is superimposed on a DC clock signal the circuit shown in FIG. 7 is used for separating the power signal therefrom. This circuit includes a first series circuit of a diode 53 and a capacitor 54 connected between the clock/power line 17 and the common line 19 and a second series circuit of an oppositely connected diode 55 and a capacitor 56 connected between the clock/power line 17 and the common line 19. A positive voltage power source is provided at terminal V+ connected to the junction between the diode 53 and the capacitor 54 and a negative voltage power source is provided at the Terminal V− connected to the junction between the diode 55 and the capacitor 56.

Figure 8:
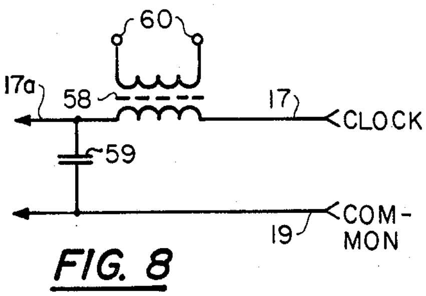
FIG. 8 is a schematic diagram of a circuit used for separating a clock signal from an AC power signal in a control (or monitor) register stage.

When the clock signal is superimposed on an AC power signal, the circuit shown in FIG. 8 is used for separating the clock signal. This circuit includes a transformer 58 having its primary winding connected in series in the clock/power line 17 and a capacitor connected between line 17$a$ and the common line 19. The AC power signal is provided between lines 17$a$ and 19. The clock signal is provided across the secondary winding terminals 60 of the transformer 58.

Figure 9:
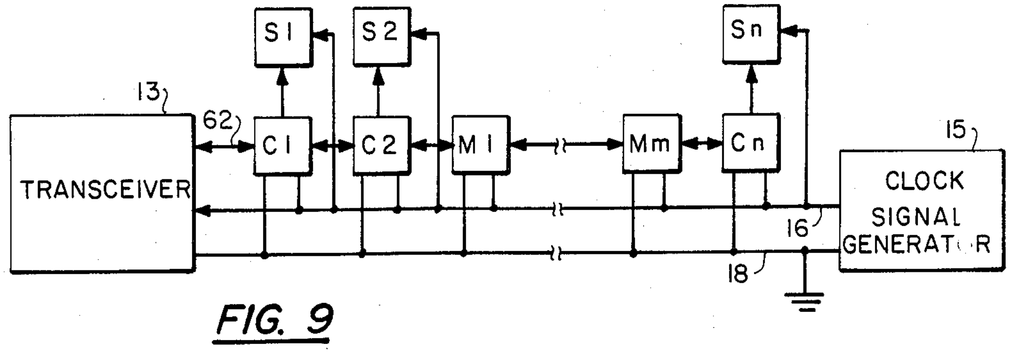
FIG. 9 is a block diagram of an alternative preferred embodiment of the telemetry system of the present invention featuring bidirectional signal flow over a single line.

Preferred embodiments of the telemetry system of the present invention featuring bidirectional signal flow over a single data line are described with reference to FIGS. 9–12. Referring first to FIG. 9, the telemetry system includes a transceiver 13, a block of series-connected parallel-output control register stages C1, C2, . . . Cn, a set of storage register S1, S2, . . . Sn, a block of series-connected parallel-input monitor register stages M1, . . . Mm; and a clock signal generator 15. A single data line 62 conveys control signals between the transceiver 13 and the control register stages C1, C2, . . . Cn and further conveys monitored signals between the monitor register stages M1, . . . Mm and the transceiver 13. The control register stages and monitor register stages include switching circuits and control circuits for controlling the switching circuits. The switching circuits alternatively switch the data line 62 into either a series circuit between the control register stages C1, C2, . . . Cn or into a series circuit between the monitor register stages M1, . . . Mm.

The control register stages C1, C2, . . . Cn are connected for operation as a shift register and the monitor register stages M1, M2, . . . Mm are connected for operation as a shift register.

The clock signal generator 15 provides a clock signal on line 16 having a series of clock pulses and a frame pulse for defining each frame. The clock signal is superimposed on a power signal for the telemetry system.

A single common line 18 is used to connect the components of the telemetry system to a common voltage reference source.

The clock signal generator 15 is coupled to the stages of the output channel by line 16 for shifting a set of control signals in series over data line 62 from the block of transmitter register stages T1, T2, . . . Tn in the transceiver 13 to the block of control register stages C1, C2, . . . Cn in response to the clock pulses during each frame of the clock signal.

The clock signal generator 15 is coupled to the stages of the input channel by line 16 for shifting a set of monitored signals in series over data line 62 from the block of monitor register stages M1, . . . Mm to the block of receiver register stages R1, R2, . . . Rm in the transceiver 13 in response to the clock pulses during each frame of the clock signal.

The control circuits in the respective register stages control the switching circuit in response to the clock signal on line 16. The switching circuits and control circuits are described in greater detail below in relation to the descriptions of the preferred embodiments of the register stages shown in FIGS. 10, 11 and 12.

The storage registers S1, S2, . . . Sn are respectively connected between the control register stages C1, C2, . . . Cn and the equipment controls EC1, EC2, . . . ECn for storing the contrl signals. The storage registers S1, S2, . . . Sn are coupled to the clock signal generator 15 to respond to each frame pulse in the clock signal by receiving and storing each set of control signals from the control register stages C1, C2, . . . Cn for provision to the equipment controls EC1, EC2, . . . ECn.

It is seen that the telemetry system of FIG. 9 may include as few as three lines in the input and output channels combined, to wit: data line 62, clock/power line 16 and common line 18. The order in which the respective control register stages C1, C2 . . . Cn and monitor register stages M1, . . . Mn are positioned in relation to each other is dependent upon the relative positions of the respective equipment controls and equipment monitors to which such register stages are connected. The order shown in FIG. 9 is merely exemplary.

Figure 10:
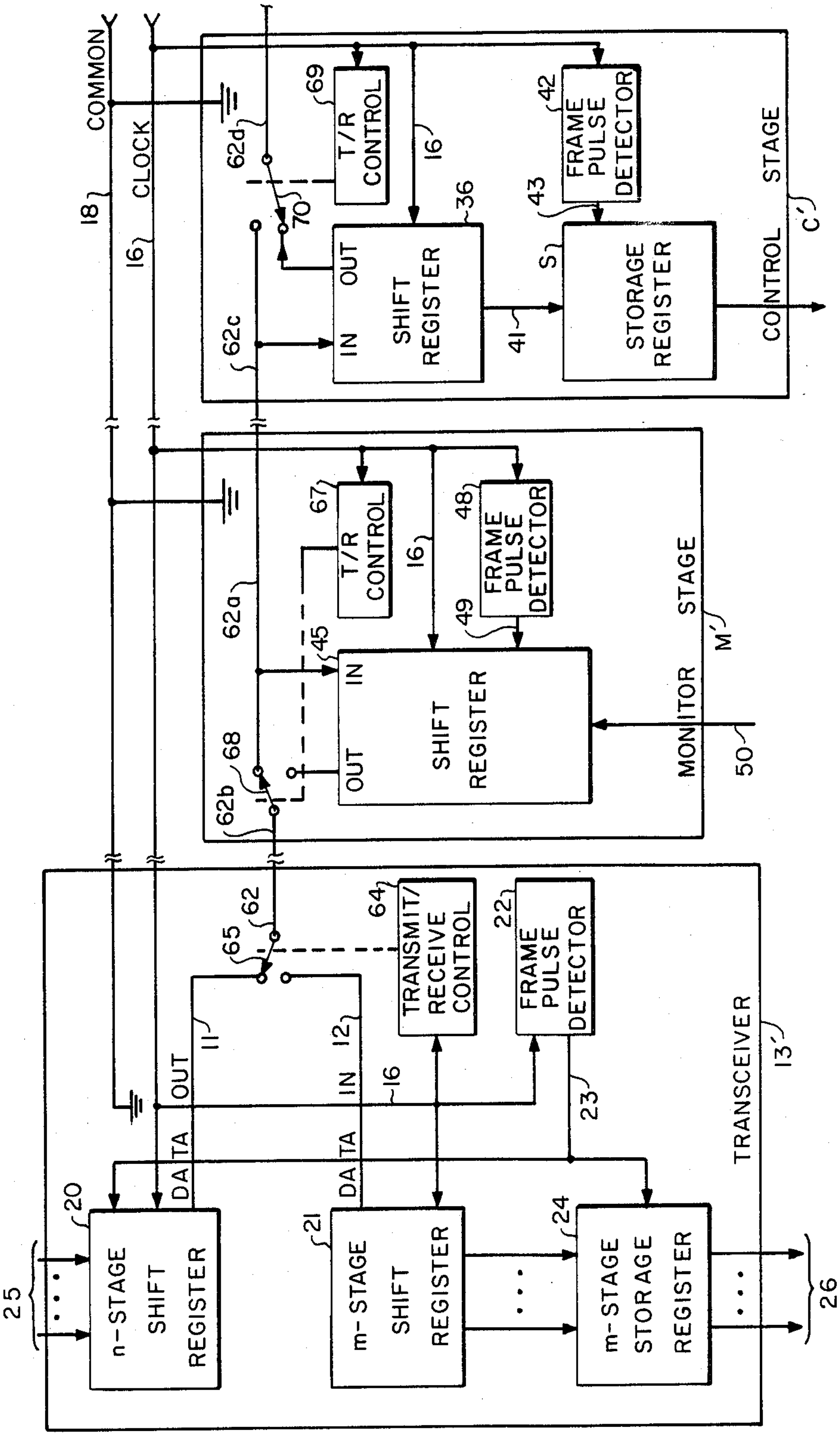
FIG. 10 is a block diagram of a preferred embodiment of the telemetry system of FIG. 9.

One preferred embodiment of the telemetry system of FIG. 9 is shown in FIG. 10. FIG. 10 shows a transceiver 13′ connected to a monitor stage M′ and a control stage C′, which are typical of the respective monitor register stages M1, . . . Mm and control register stages C1 C2, . . . Cn in the telemetry system of FIG. 9.

The transceiver 13′ includes an n-stage shift register and m-stage shift register 21, an m-stage storage register 24, a frame pulse detector 22, a transmit/receive control circuit 64 and a switch 65.

Each monitor stage M′ includes a shift register 45, a frame pulse detector 48, a transmit/receive control circuit 67 and a switch 68.

Each control stage C′ includes a shift register 36, a storage register S, a pulse frame detector 42, a transmit/receive control circuit 69 and a switch 70.

The respective transmit/receive control circuits 64, 67 and 69 in the transceiver 13′, the monitor register stage M′ and the control register stage C′ control the respective switches 65, 68 and 70 in response respectively to detection of the leading and trailing edges of the clock pulses in the clock signal on line 16 so as to alternately connect the data line 62 either into a series between the m-stage shift register 21 and the block of monitor register stages M′, . . . (which is opposite to the switching connections shown in FIG. 10) or into a series circuit between the n-stage shift register 20 and the block of control register stages C′, . . . (as shown in FIG. 10).

The m-stage shift register 21 in the transceiver 13′ receives the monitored signals in series over data input line 12 from the monitor register stages M′, . . . when the data line 62 is connected in series between the m-stage shift register 21 and the monitor register stages M′, . . . by the switches 65, 68 and 70.

The n-stage shift register 20 in the transceiver 13′ provides the control signals in series over data line 11 to the control register stages C′, . . . when the data line 62 is connected in series between the n-stage shift register 20 and the control register stages C′, . . . by the switches 65, 68 and 70.

The frame pulse detector circuit 22 in the transceiver 13′ detects the frame pulse in the clock signal on line 17 and provides load control signals on line 23 to the n-stage shift register 20 and the m-stage shift register 21 in response to each frame pulse. Control signals provided from the controller 10 via lines 25 are stored in the n-stage shift register 20 in response to each load control signal on line 23. The monitored signals received by the m-stage shift register 21 are loaded in the m-stage storage register 24 in response to each load control signal on line 23. The monitored signals stored in the m-stage shift register 24 are provided to the controller 10 via the lines 26.

The shift register 45 in each monitor register stage M′ shifts a monitored signal on data line 62*a* to data line 62*b* in response to each clock pulse in the clock signal on clock/power line 16 from the clock signal generator 15. The frame pulse detector 48 detects frame pulses in the clock signal on line 16 and responds to the detection thereof by providing a load control signal on line 49. The shift register 45 responds to the load control signal on line 49 by receiving a monitored signal provided to its parallel input on line 50. The shift register 36 in each control register stage C′ shifts a control signal on data line 62*c* to data line 62*d* and to a parallel output line 41 in response to each clock pulse in the clock signal on clock/power line 16 from the clock signal generator 15. The frame pulse detector 42 detects frame pulses in the clock signal on line 16 and responds to the detection thereof by providing a load control signal on line 43. The storage register S responds to the load control signal on line 43 by receiving and storing the control signal provided on parallel output line 41 from the shift register 36.

Figure 11:
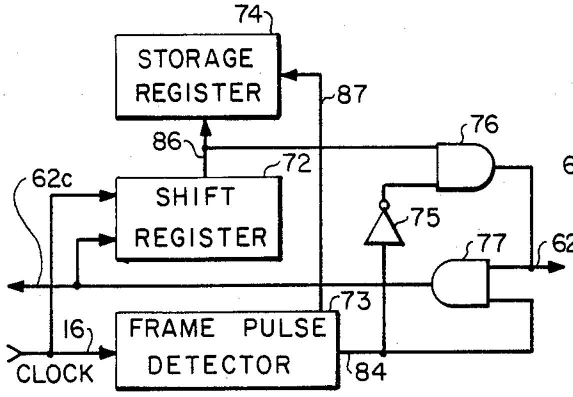
FIG. 11 is a block diagram of an alternative preferred embodiment of a control register stage for the telemetry system of FIG. 9.
Figure 12:
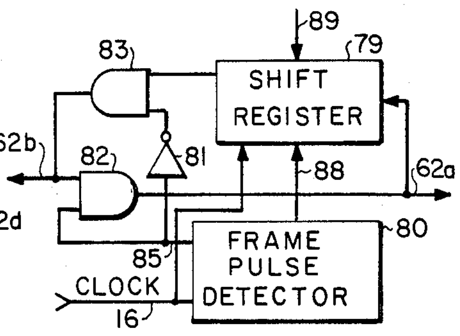
FIG. 12 is a block diagram of an alternative preferred embodiment of a monitor register stage for the telemetry system of FIG. 9.

Alternative preferred embodiments of the control register stages C1, C2, . . . Cn and the monitor register stages M1, . . . Mn in the system of FIG. 9 are shown in FIGS. 11 and 12 respectively. In these embodiments the data line 62 is switched into the alternative series circuits in response to detection of alternate frame pulses of the clock signal on line 16.

A control register stage that has its operation controlled in response to detection of alternate frame pulses is shown in FIG. 11. It includes a shift register 72, a frame pulse detector 73, a storage register 74, an inverter 75 and two AND gates 76 and 77 connected as shown.

A monitor register stage that has its operation controlled in response to detection of alternate frames pulses is shown in FIG. 12. It includes a shift register 79, a frame pulse detector 80, an inverter 81 and two AND gates 82 and 83 connected as shown. The frame pulse detectors 73 and 80 detect the frame pulses in the clock signal on line 16 from the clock signal generator 15. The frame pulse detectors 73 and 80 include counters for counting the detecting frame pulses. When such count is an odd number, the frame pulse detector 73 provides a logical "high" signal on line 84 and the frame pulse detector 80 provides a logical "low" signal on line 85. When such count is an even number the frame pulse detector provides a "low" signal on line 84 and the frame pulse detector 80 provides a "high" signal on line 85.

Accordingly when the count is odd, the AND gate 77 in the control register stage (FIG. 11) is enabled by the high signal on line 84 for passing monitored signals received from data line 62*d* onto data line 62*c*, and the AND gate 76 is inhibited by the low signal provided from the inverter 75 from passing a control signal from the shift register 72 onto the data line 62*d*. Also when the count is odd, the AND gate 82 in the monitor register stage (FIG. 12) is inhibited by the low signal on line 85 from passing control signals received from data line 62*b* onto data line 62*a*, and the AND gate 83 is enabled by the high signal provided from the inverter 81 for passing a monitored signal from the shift register 79 onto the data line 62*b*.

When the count is even, the AND gate 82 in the monitor register stage (FIG. 12) is enabled by the high signal on line 85 for passing control signals received from data line 62*b* onto data line 62*a*, and the AND gate 83 is inhibited by the low signal provided from the inverter 81 from passing a monitored signal from the shift register 79 onto the data line 62*b*. Also when the count is even, the AND gate 77 in the control register stage (FIG. 11) is inhibited by the low signal on line 84 from passing monitored signals received from data line 62*d* onto data line 62*c*, and the AND gate 76 is enabled by the high signal provided from the inverter 75 for passing a control signal from the shift register 72 onto the data line 62*d*.

In each control register stage (FIG. 11) during the even-numbered frames, the shift register 72 shifts control signals on line 62*c* to the data line 62*d* via the AND gate 76 and to a parallel output line 86 in response to each clock pulse in the clock signal on line 16 from the clock signal generator 15. The frame pulse detector 73 responds to the detection of each frame pulse in the clock signal on line 16 by providing a load control signal on line 87 to the storage register 74. The storage register 74 responds to the load control signal on line 87 by receiving and storing the control signal provided on parallel output line 86 from the shift register 72.

In each monitor register stage (FIG. 12) during odd-numbered frames, the shift register 79 shifts monitored signals on line 62*a* to the data line 62*b* via the AND gate 83 in response to each clock pulse in the clock signal on line 16 from the clock signal generator 15. The frame pulse detector 80 responds to the detection of each frame pulse in the clock signal on line 16 by providing a load control signal on line 88 to the shift register 79. The shift register 79 responds to the load control signal on line 88 by receiving a monitored signal provided to its parallel input on line 89 and by providing the received monitored signal on data line 62*b*.

Figure 13:
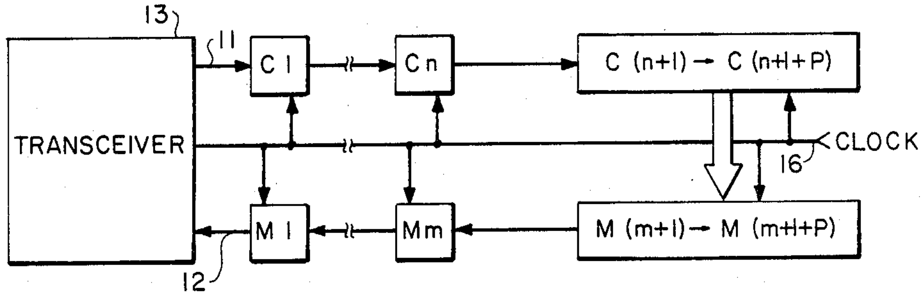
FIG. 13 is a block diagram of an alternative preferred embodiment of the telemetry system of the present invention featuring additional stages to facilitate error checking.

A preferred embodiment of the telemetry system of the present invention adapted to facilitate error checking of the control signals provided on output data line 11 from the transceiver 13 is shown in FIG. 13. In this embodiment, the output channel further includes a block of series-connected parallel-output register stages C (n+1) →C (n+1+P) connected in series with the control register stages C1, . . . Cn remote from the transceiver 13 for receiving a series of error-checking signals communicated in series with the control signals from the transmitter register stages T1, T2, . . . Tn. "P" is an integer greater than one. The input channel further includes a block of series-connected parallel-input register stages (M (m+1)→M (m+1+P) connected to the block C (n+1)→C (n+1+P) for receiving the error-checking signals therefrom and connected in series with the monitor register stages M1, . . . Mn remote from the transceiver 13 for communicating the error checking signals in series with the monitored signals to the receiver register stages R1, R2, . . . Rm. These error checking signals received by the receiver register stages R1, R2, . . . Rm subsequently are transferred to the controller 10 where they are compared to the error-checking signals originally transmitted from the transmitter register stages T1, T2, . . . Tn.

The control register stages C1, . . . Cn and the stages of the block C (n+1)→C (n+1+P) are connected for operation as a shift register; and the monitor register stages M1, . . . Mm and the stages of the block M (m+1)→(M+1+P) are connected for operation as a shift register.

The clock signal generator 15 (FIG. 1) is coupled to the stages of the output channel for shifting a received set of control signals and the error-checking signals in series from the transmitter register stages T1, . . . Tn to the control register stages C1, . . . Cn and the block of register stages C (n+1)→C (n+1+P) respectively in response to the clock pulses during each frame of the clock signal on line 16. The clock signal generator 15 also is coupled to the stages of the input channel for causing the block of register stages M (m+1)→M (m+1+P) to receive the error-checking signals from the block of register stages C (N+1)→C (n+1+P) in response to each frame pulse in the clock signal on line 16 and for shifting a received set of monitored signals and the received error-checking signals in series from the monitor register stages M1, . . . Mm and the block M (m+1)→M (m+1+P) respectively to the receiver register stages R1, . . . Rm in response to the clock pulses during each frame pulse of the clock signal on line 16.

In some equipment systems the equipment controls are distributed in a number of separate branches and the equipment monitors are distributed in a number of separate branches, whereby it is not practical to string single data lines between all of the controls or monitors of the system. FIGS. 14–18 illustrate embodiments of the telemetry system of the present invention having parallel branches of control register stages and/or parallel branches of monitor register stages for use with equipment systems having equipment controls and/or monitors distributed in separate branches.

Figure 14:
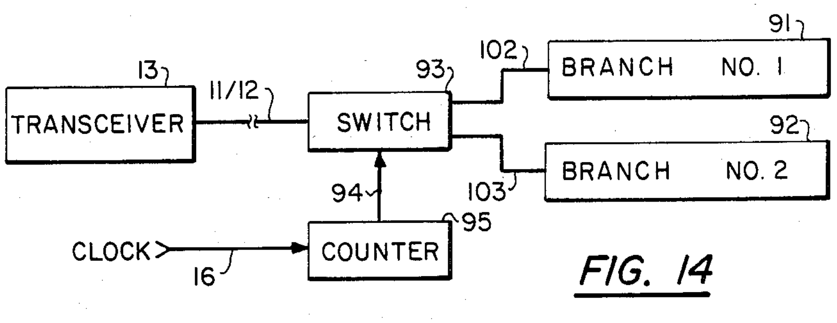
FIG. 14 is a block diagram illustrating the transfer of signals between separate branches of control (or monitor) register stages and the transceiver.

One preferred embodiment of a telemetry system input or output channel having parallel branches is shown in FIG. 14. The channel includes a first branch of register stages 91 and a second branch of register stages 92. This embodiment is initially described in the context of both parallel branches 91, 92 including control register stages, such as C1, C2, . . . Cn, as shown in FIGS. 1 and 2.

The control register stages of the first branch 91 are respectively positioned at equipment controls of a first branch for providing control signals thereto; and the control register stages of the second branch 92 are respectively positioned at equipment controls of a second branch for providing control signals thereto. Each branch of control register stages 91, 92 is connected in series with the transmitter register stages T1, T2, . . . Tn in the transceiver 13 for receiving control signals in series from the transmitter register stages in the transceiver 13.

In this embodiment the telemetry system includes a branch control circuit for alternatively shifting control signals from the transmitter register stages T1, T2, . . . Tn in the transceiver 13 to either the first branch of control register stages 91 or the second branch of control register stages 92. The branch control circuit includes a switch 93 and a one-bit counter 94. The counter 94 counts the clock pulses in each frame of the clock signal on line 16 from the clock signal generator 15 (FIG. 1) and provides a count signal on line 95. The switch 93 is connected between the transceiver 13 and the first and second branches 91, 92 of control register stages for controlling whether the control signals from the transmitter register stages T1, T2, . . . Tn in the transceiver 13 are shifted to the first branch 91 or the second branch 92 of control register stages C1, C2, . . . Cn in accordance with the state of the count signal on line 95.

The telemetry system of FIG. 14 also is useful when both of the parallel branches 91, 92 includes monitor register stages, such as M1, M2, . . . Mm, as shown in FIGS. 1 and 2.

The monitor register stages of the first branch 91 are respectively positioned at equipment monitors of a first branch for receiving monitored signals therefrom; and the monitor register stages of the second branch 92 are respectively positioned at equipment monitors of a second branch for receiving monitored signals therefrom. Each branch of monitor register stages 91, 92 is connected in series with the receiver register stages R1, R2, . . . Rm in the transceiver 13 for providing monitored signals in series to the receiver register stages in the transceiver 13.

The branch control circuit 93, 94 described hereinabove alternatively shifts monitored signals to the receiver register stages R1, R2, . . . Rm in the transceiver 13 from either the first branch of monitor register stages 91 or the second branch of monitor register stages 92. The switch 93 is connected between the transceiver 13 and the first and second branches 91, 92 of monitor register stages for controlling whether the monitored signals provided to the receiver register stages R1, R2, . . . Rm in the transceiver 13 are shifted from the first branch 91 or the second branch 92 of monitor register stages M1, M2, . . . Mm in accordance with the stage of the count signal on line 95.

Figure 15:
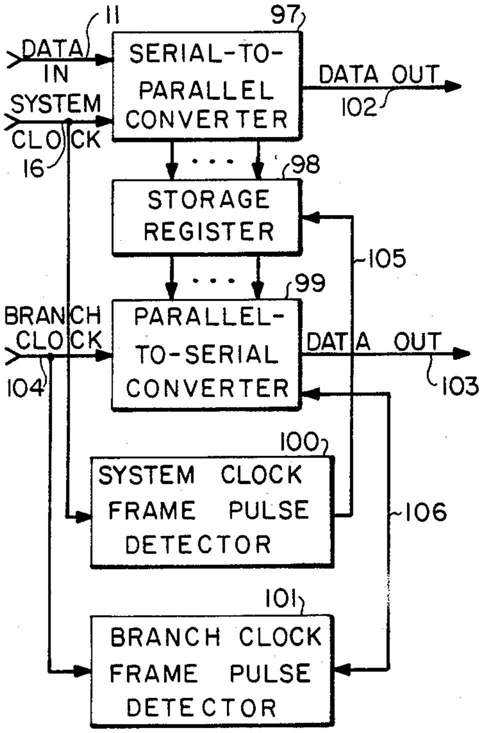
FIG. 15 is a block diagram of a system for transferring control signals to separate branches of control register stages alternative to the system shown in FIG. 14.

In an alternative preferred embodiment of the telemetry system adapted for providing control signals to parallel branches of control register stages, a block of series-connected transfer stages is substituted for the switch 93 between the transceiver 13 and the first and second parallel branches 91, 92 shown in FIG. 14. A preferred embodiment of such a block of series-connected transfer stages is shown in FIG. 15. The block of transfer register stages for transferring control signals includes a serial-to-parallel converter 97, a storage register 98, a parallel-to-serial converter 99, a system clock frame pulse detector 100 and a branch clock frame pulse detector 101. The block of series-connected register stages is connected in series between the transmitter register stages T1, T2, . . . Tn in the transceiver 13 and the first branch of control register stages 91 for providing the control signals for the first branch 91 in series over line 102 to the first branch 91 and is connected in series between the transmitter register stages in the transceiver 13 and the second branch 92 for receiving a set of control signals for the second branch 92 in series from the transmitter register stages T1, T2, . . . Tn when the control signals for the first branch 91 are received by the first branch 91 and for subsequently transferring the control signals for the second branch 92 in series over line 103 to the second branch 92.

The system clock signal generator 15 provides a system clock signal on line 16 having a series of clock signals and a frame pulse for defining each frame of the system clock signal.

A branch clock signal generator (not shown) provides a branch clock signal on line 104 having a series of clock pulses and a frame pulse for defining each frame of the branch clock signal.

The serial-to-parallel converter 97 provides the control signals for the first branch in series over data line 102 to the first branch 91 and receives the control signals for the second branch 92 in series therewith from the transceiver 13 via line 11 in response to the clock pulses of the system clock signal on line 16. The storage register 98 is connected to the serial-to-parallel converter 97 for receiving and temporarily storing the control signals for the second branch 92 in parallel in response to a load control signal provided on line 105 by the system clock frame pulse detector 100 in response to detection of each frame pulse of the system clock signal on line 16. The parallel-to-serial converter 99 receives stored control signals for the second branch 92 in parallel from the storage register 98 in response to a load control signal provided on line 106 by the branch clock frame pulse detector 101 in response to detection of the frame pulse of the branch clock signal on line 104. The parallel-to-serial converter 99 provides the control signals for the second branch 92 in series over line 103 to the second branch 92 in response to the clock pulses of the branch clock signal on line 104.

Figure 16:
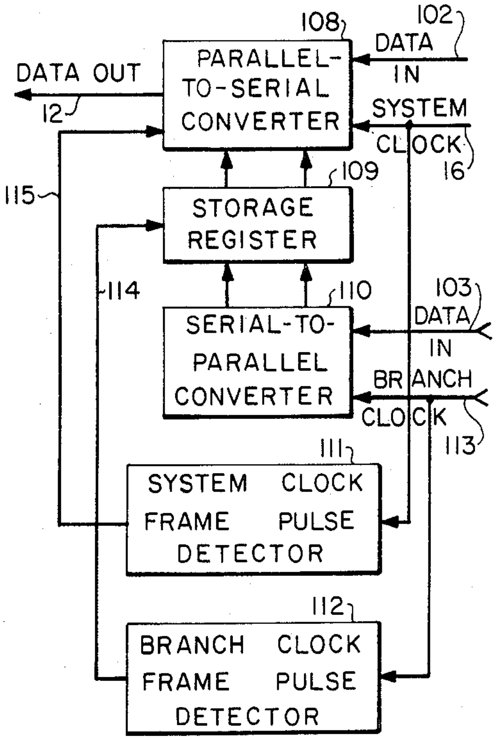
FIG. 16 is a block diagram of a system for transferring monitored signals from separate branches of monitor register stages alternative to that shown in FIG. 14.

FIG. 16 shows an alternative preferred embodiment of the telemetry system adapted for receiving monitored signals from parallel branches of monitor register stages. A block of series connected transfer stages are substituted for the switch 93 between the transceiver 13 and the first and second parallel branches 91, 92 shown in FIG. 14. The block of transfer stages for transferring monitored signals includes a parallel-to-serial converter 108, a storage register 109, a serial-to-parallel converter 110, a system clock frame pulse detector 111 and a branch clock frame pulse detector 112.

The block of series-connected transfer register stages is connected in series between the first branch of monitor register stages 91 and the block of receiver register stages in the transceiver 13 for providing the monitored signals in series over line 102 from the first branch 91 to the receiver register stages R1, R2, . . . Rm via line 12, and is connected in series between the second branch of monitor register stages 92 and the receiver register stages in the transceiver 13 for transferring the monitored signals from the second branch 92 via line 103 into series with the monitored signals from the first branch 91 on line 12 and for subsequently providing a set of transferred monitored signals from the second branch 92 in series via line 12 to the receiver register stages in the transceiver 13.

The system clock signal generator 15 provides a system clock signal on line 16 having a series of clock pulses and a frame pulse for defining each frame of the system clock signal.

A branch clock signal generator (not shown) provides a branch clock signal on line 113 having a series of clock pulses and a frame pulse for defining each frame of the branch clock signal.

The serial-to-parallel converter 110 receives the monitored signals in series over data line 103 from the second branch of monitor register stages 92 in response to the clock pulses of the branch clock signal on line 113. The storage register 110 is connected to the serial-to-parallel converter 111 for receiving in parallel and temporarily storing the received monitored signals from the second branch 92 in response to a load control signal provided on line 114 by the branch clock frame pulse detector 112 in response to detection of the frame pulse of the branch clock signal on line 113. The parallel-to-serial converter 108 receives the stored monitored signals from the storage register 109 in response to a load control signal provided on line 115 by the system clock frame pulse detector 111 in response to detection of the frame pulse of the system clock signal on line 16. The parallel-to-serial converter 108 provides the received stored monitored signals from the second branch 92 in series with the monitored signals from the first branch 91 to the receiver stages in the transceiver 13 in response to the clock pulses of the system clock signal on line 16.

In some instances the number of control register stages C1, C2, . . . Cn in a given branch may be so great that the number of available transmitter register stages T1, T2, . . . Tn in the transceiver 13 is not great enough to provide control signals to all of the control register stages during each frame of the system clock signal on line 16. In such instances different sets of control signals for different sub-sets of control register stages in the given branch are provided from the controller 10 to the transmitter register stages in the transceiver during each frame of the system clock signal. Each set of control signals for the given branch of control register stages includes m address bits and n control bits. "m" and "n" are integers greater than zero.

An exemplary embodiment of a system, such as shown in FIG. 15, for transferring control signals to a branch having a large number of control register stages is described with reference to FIG. 17. This embodiment is designed for transferring control bits to a second stage 92 having sixteen control register stages C1, C2, . . . Cn. Accordingly, the parallel-to-serial converter 99 is a 16-bit parallel-input shift register, and the storage register 98 includes four 4-bit storage register elements 98*a*, 98*b*, 98*c* and 98*d* and a decoder 116. Each set of control signals for the second branch 92 includes two address bits and four control bits; and the serial-to-parallel converter 97 is a 6-bit parallel-output shift register.

The 6-bit parallel output shift register 97 provides a set of control bits for the first branch 91 in series over data line 102 to the first branch 91; provides two address bits on lines 117 and 118 to the decoder 116; and provides four control bits in parallel to each of the four storage register elements 98*a*, 98*b*, 98*c* and 98*d* via lines 119, 120, 121 and 122 during each frame of the system clock signal on line 16. The decoder 116 is connected to the respective storage register elements 98*a*, 98*b*, 98*c* and 98*d* by lines 123, 124, 125 and 126 for enabling a separate storage register element to store the control signals on lines 119, 120, 121 and 122 in accordance with the content of the address bits on lines 117 and 118 and in response to the load control signal on line 105 from the system clock frame pulse detector 100.

The 16-bit parallel-input shift register 99 is connected to the storage register elements 98*a*, 98*b*, 98*c* and 98*d* for receiving sixteen control bits in parallel therefrom in response to the load control signal on line 106 from the branch clock frame pulse detector 101. The 16-bit parallel-input shift register 99 provides the sixteen control signals in series over data line 103 to the second branch 92 in response to the branch clock signal on line 104.

Figure 17:
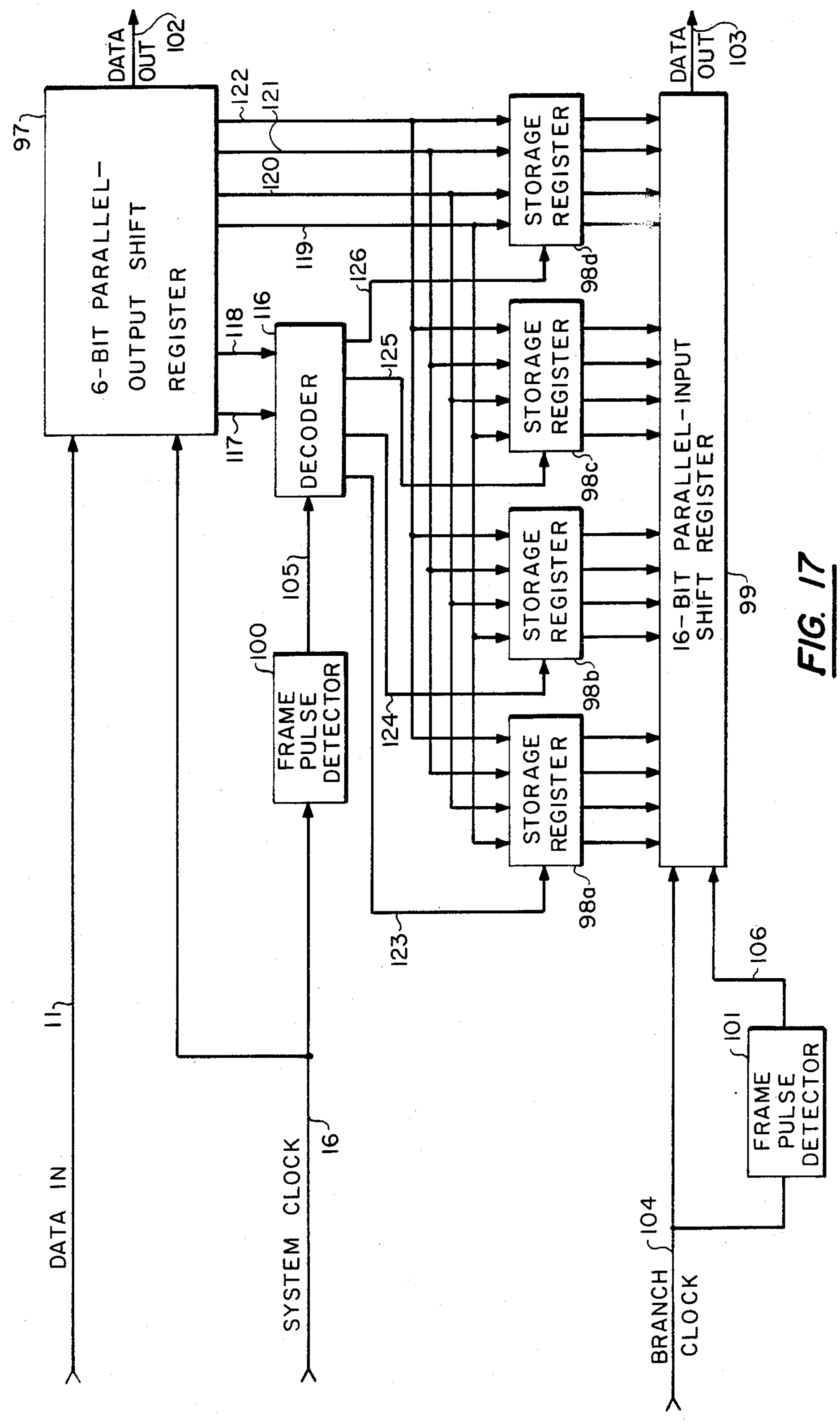
FIG. 17 is a block diagram of a preferred embodiment of the transfer system of FIG. 15 featuring time-division demultiplexing of the control signals for transmission in series to one branch of control register stages.

The number of storage register elements 98 and the capacity of the shift registers 97 and 99 and the decoder 116 in the transfer register stage of FIG. 17 is determined in accordance with the following.

The storage register 98 includes $2^m$ storage elements. Each storage element is connected to the parallel-output shift register 97 for storing n control bits. The parallel-output shift register 97 has a capacity of m+n bits. The decoder 116 is an m-bit decoder. The parallel-input shift register 99 has a capacity of $2^m \times n$ bits.

An exemplary embodiment of a transfer system, such as shown in FIG. 16, for transferring monitored signals from a branch having a large number of monitor register stages is described with reference to FIG. 18. This embodiment is designed for transferring monitored bits from a second branch 92 having sixteen monitor register stages M1, M2, . . . Mm. Accordingly, the serial-to-parallel converter 110 is a 16-bit parallel-output shift register, and the storage register 109 includes four 4-bit storage register elements 109*a*, . . . 109*d*, a decoder 128 and a 4-bit counter 129.

The shift register 110 is connected to the second branch 92 for receiving sixteen monitored signal bits in series from data line 103 during each frame of the branch clock signal on line 113. The four 4-bit storage register elements 109*a*, . . . 109*d* are connected to the 16-bit parallel-output shift register 110 for receiving the sixteen monitored signals in parallel from the shift register 110 in response to the load control signal on line 114 from the branch clock frame pulse detector 112. The sixteen monitored signals so received are stored by the four storage register elements 109*a*, . . . 109*d*. The 4-bit counter 129 is connected to the system clock frame pulse detector 111 for counting the load control signals on line 115, which is equivalent to counting the frame pulses in the system clock signal on line 16. The 4-bit counter provides a 2-bit address signal on lines 130 and 131 to the 6-bit parallel-input shift register 108 and the decoder 128 in accordance with the count of frame pulses in the system clock signal.

The shift register 108 receives and shifts a set of monitored bits from the first branch 91 in series from line 102 during each frame of the system clock signal on line 16.

The decoer 128 is connected to the respective storage register elements 109*a*, . . . 109*d* by lines 133, 134, 135 and 136 for enabling a set of monitored signals to be provided on lines 137, 138, 139 and 140 to the shift register 108 from a separate storage register element in accordance with the content of the address signal on lines 130 and 131.

The 6-bit parallel-input shift register 108 thereby receives four monitored signals and two address signals in parallel during each frame of the system clock signal and transfers the four monitored bits and the two address bits in series with the monitored bits from the first branch 91 over data line 12 to the receiver register stages R1, R2, . . . Rm in the transceiver 13 in response to the system clock signal on line 16. When the set of monitored signals received by the receiver register stages R1, R2, . . . Rm are provided to the controller 10, the two address bits identify the sub-set of monitor register stages in the second branch 92 that the accompanying four monitored signals are derived from.

Figure 18:
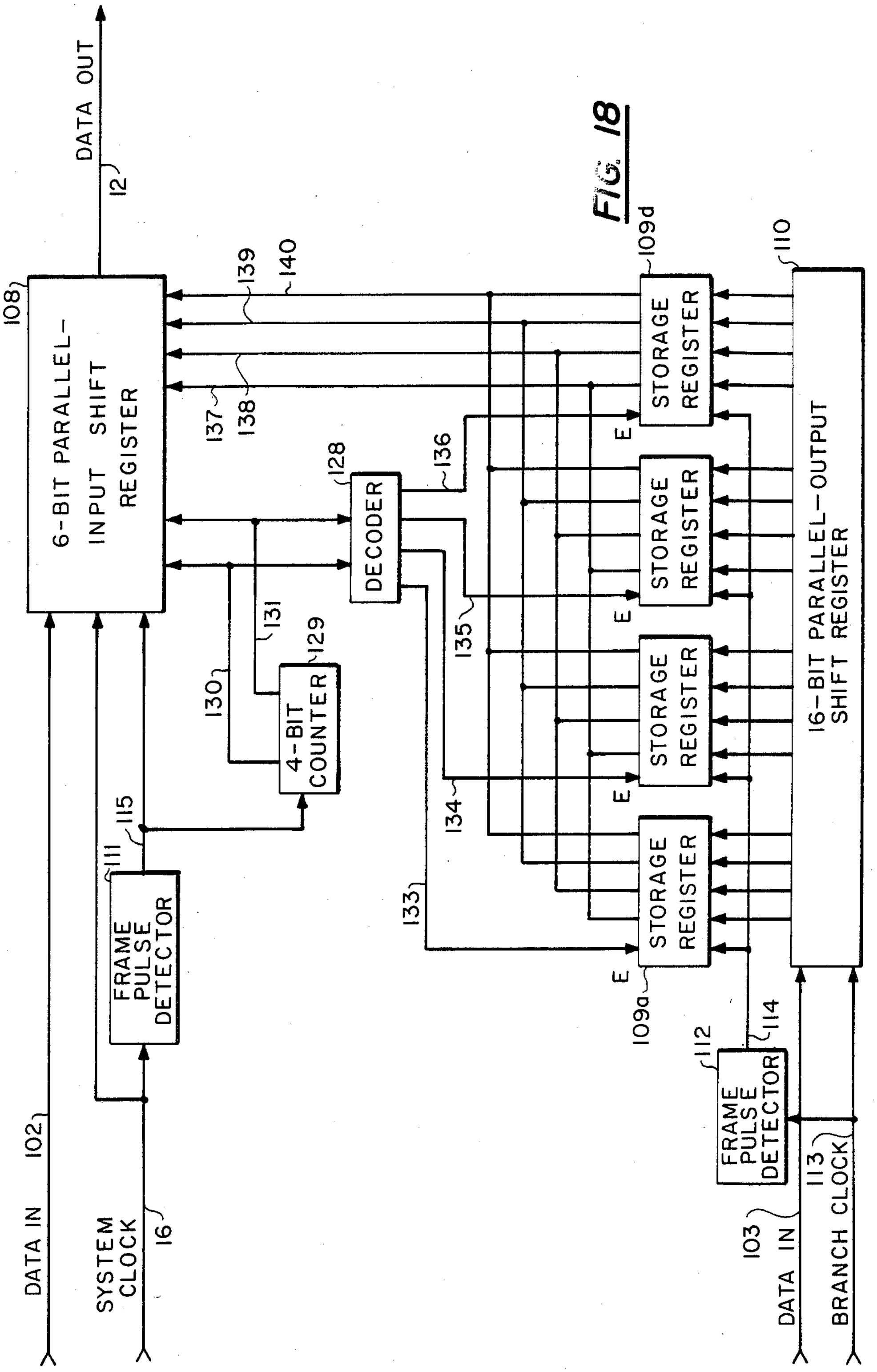
FIG. 18 is a block diagram of a preferred embodiment of the transfer system of FIG. 16 featuring time-division multiplexing of the monitored signals provided in series to the transfer system from one branch of the monitor register stages.

The number of storage register elements 109 and the capacities of the shift registers 108, 110, the counter 129 and the decoder 128 are interrelated to the respective numbers of address bits and monitored signal bits in the set of monitored signals transferred by the transfer register stage of FIG. 18. Assume that each set of monitored signals provided by the transfer register stage includes m address bits and n monitored bits, wherein m and n are integers greater than zero. The parallel-output shift register 110 has a capacity of $2^m \times n$ bits. The storage register 109 includes $2^m$ n-bit storage elements. Each storage element is capable of storing n monitored signal bits. The counter 129 is a $2^m$-bit counter, which provides an m-bit address signal. The decoder 128 is an m-bit decoder. The parallel-input shift register 108 has a capacity of m+n bits.

I claim:

1. A telemetry system for a plurality of distributed equipment controls and a plurality of distributed equipment monitors, comprising an output channel for communicating control signals to said distributed equipment controls, including a first block of register stags for receiving in given register stags of the first block from a controller a set of control signals that are intended for respective distributed equipment controls; and a second block of distributed, parallel-output register stages connected in series with each other and with the first block by an output data line for receiving said control signals in series from the first block, and respectively positioned at said equipment controls for providing said control signals to the intended respective equipment controls; and an input channel for communicating monitored signals from said distributed equipment monitors, including a third block of distributed, parallel-input register stags connected in series with each other by an input data line and respectively positioned at said equipment monitors for connection to said equipment monitors for receiving in given register stages of the third block from said respective equipment monitors a set of monitored signals that are intended for respective stages of a fourth block of register stages; and a fourth block of register stages connected in series with the third block of register stages by the input data line for receiving said monitored signals in said intended register stages of the fourth block in series from the respective given register stages of the third block; and a clock signal generator for generating a clock signal consisting of a series of clock pulses and a frame pulse for defining each frame of the clock signal;

wherein the first block and each stage of the second block are connected to the clock signal generator for receiving the clock signal and are responsive solely to the clock signal for transferring each set of control signals from the given register stages of the first block to the respectively positioned register stages of the second block and for transferring each set of control signals from the stages of the second block to the respective intended equipment controls; and wherein the fourth block and each stage of the third block are connected to the clock signal generator for receiving the clock signal and are responsive solely to the clock signal for transferring to the respective intended register stages of the fourth block each set of monitored signals received from the equipment monitors by the respectively positioned given register stages of the third block and for transferring each set of monitored signals from the respective equipment monitors to the stages of the third block.

2. A system according to claim 1, comprising a set of distributed storage registers connected between the stages of the second block and said equipment controls for storing said control signals;

wherein the storage registers are coupled to the clock signal generator to respond to each frame pulse in the clock signal by receiving and storing each set of control signals from the stages of the second block for provision to said equipment controls.

3. A system according to claim 1, wherein the first and fourth blocks are embodied in random access memories (RAMs).

4. A system according to claim 3, comprising an address generator connected to the clock signal generator for providing a first series of progressive address signals in response to the clock pulses in each frame of the clock signal and a second series of progressive address signals in response to the clock pulses in each frame of the clock signal;

wherein the address generator is connected to the RAM in which the first block of register stages is embodied for addressing the stages of the first block with the first series of progressive address signals to serially retrieve a said received set of control signals from the first block for shifting to the second block; and wherein the address generator is connected to the RAM in which the fourth block of register stages is embodied for addressing the stages of the fourth block with the second series of progressive address signals to serially store a said received set of monitored signals shifted from the third block.

5. A system according to claim 1, wherein the output channel further includes a fifth block of series-connected parallel-output register stages connected in series with the second block remote from the first block for receiving a series of error-checking signals communicated in series with the control signals from the first block; and wherein the input channel further includes a sixth block of series-connected parallel-input register stages connected to the fifth block for receiving the error-checking signals therefrom and connected in series with the third block remote from the fourth block for communicating the error checking signals in series with the monitored signals to the fourth block.

6. A system according to claim 5, wherein the fifth block of register stages is responsive solely to the clock signal for shifting the error-checking signals in series from the first block to the fifth block during each frame of the clock signal; and wherein the sixth block of register stages is responsive to the frame pulse of the clock signal for receiving each set of error-checking signals from the fifth block and is responsive solely to the clock signal for shifting the received error-checking signals in series from the sixth block to the fourth block during each frame of the clock signal.

7. A system according to claim 1, comprising a first line connected to each of the stages of the second block for conveying a power signal with the clock signal from the clock signal generator superimposed thereon; and a second line connected to each of the stages of the third block for conveying a power signal with the clock signal from the clock signal generator superimposed thereon.

8. A telemetry system for a plurality of distributed equipment controls and a plurality of distributed equipment monitors comprising a communication channel for communicating control signals to said distributed equipment controls and for communicating monitored signals from said distributed equipment monitors, including a first block of register stages for receiving in given register stages of the first block from a controller a set of control signals that are intended for respective distributed equipment controls;

a second block of distributed, parallel-output register stages connected in series with each other and with the first block by a data line for receiving said control signals in series from the first block, and respectively positioned at said equipment controls for connection to said equipment controls for providing said control signals to the intended respective equipment controls;

a third block of distributed, parallel-input register stages connected in series with each other by the data line and respectively positioned at said equipment monitors for connection · to said equipment monitors for receiving in given register stages of the third block from said respective equipment monitors a set of monitored signals that are intended for respective stages of a fourth block of register stages; and a fourth block of register stages connected in series with a third block of register stages by the input data line for receiving said monitored signals in said intended register stages of the fourth block in series from the respective given register stages of the third block;

a switching circuit for alternatively switching the data line into either a series circuit between the stages of the second block or into a series circuit between the stages of the third block;

a clock signal generator for generating a clock signal consisting of a series of clock pulses and a frame pulse for defining each frame of the clock signal;

a control circuit for controlling the switching circuit in response to the clock signal;

wherein the first and fourth block and each stage of the second and third blocks are connected to the clock signal generator for receiving the clock signal and are responsive solely to the clock signal for transferring each set of control signals from the given register stages of the first block to the respectively positioned register stages of the second block and for transferring each set of control signals from the stages of the second block to the respective intended equipment controls, and is further responsive solely to the clock signal for transferring to the respective intended register stages of the fourth block each set of monitored signals received from the equipment monitors by the respectively positioned given register stages of the third block and for transferring each set of monitored signals from the respective equipment monitors to the stages of the third block.

9. A system according to claim 8, comprising a set of distributed storage registers connected between the stages of the second block and said equipment controls for storing said control signals;

wherein the storage registers are coupled to the clock signal generator to respond to each frame pulse in the clock signal by receiving and storing each set of control signals from the stages of the second block for provision to said equipment controls.

10. A system according to claim 8, wherein the first and fourth blocks are embodied in random access memories (RAMs).

11. A system according to claim 10, comprising an address generator connected to the clock signal generator for providing a first series of progressive address signals in response to the clock pulses in each frame of the clock signal and a second series of progressive address signals in response to the clock pulses in each frame of the clock signal;

wherein the address generator is connected to the RAM in which the first block of register stages is embodied for addressing the stages of the first block with the first series of progressive address signals to serially retrieve a said received set of control signals from the first block for shifting to the second block; and wherein the address generator is connected to the RAM in which the fourth block of register stages is embodied for addressing the stages of the fourth block with the second series of progressive address signals to serially store a said received set of monitored signals shifted from the third block.

12. A system according to claim 8, comprising a first line connected to each of the stages of the second block for conveying a power signal with the clock signal from the clock signal generator superimposed thereon; and a second line connected to each of the stages of the third block for conveying a power signal with the clock signal from the clock signal generator superimposed thereon.

13. A telemetry system for a plurality of distributed equipment controls, comprising an output channel for communicating control signals to said distributed equipment controls, including a first block of register stages for receiving in given register stags of the first block from a controller a set of control signals that are intended for respective distributed equipment controls; and a second block of distributed, parallel-output register stages connected in series with each other and with the first block by an output data line for receiving said control signals in series from the first block, and respectively positioned at said equipment controls for connection to said equipment controls for providing said control signals to the intended respective equipment controls; and a clock signal generator for generating a clock signal consisting of a series of clock pulses and a frame pulse for defining each frame of the clock signal;

wherein the first block and each stage of the second block are connected to the clock signal generator for receiving the clock signal and are responsive solely to the clock signal for transferring each set of control signals from the given register stages of the first block to the respectively positioned register stages of the second block and for transferring each set of control signals from the stages of the second block to the respective intended equipment controls.

14. A system according to claim 13, comprising a set of distributed storage registers connected between the stages of the second block and said equipment controls for storing said control signals;

wherein the storage registers are coupled to the clock signal generator to respond to each frame pulse in the clock signal by receiving and storing each set of control signals from the stages of the second block for provision to said equipment controls.

15. A system according to claim 13, wherein the first block is embodied in a random access memory (RAM).

16. A system according to claim 15, comprising an address generator connected to the clock signal generator for providing a series of progressive address signals in response to the clock pulses in each frame of the clock signal;

wherein the address generator is connected to the RAM for addressing the stages of the first block with the series of progressive address signals to serially retrieve a said received set of control signals from the first block for transfer to the second block.

17. A system according to claim 13, comprising
a first line connected to each of the stages of the second block for conveying a power signal with the clock signal from the clock signal generator superimposed thereon.

18. A telemetry system for a plurality of distributed equipment monitors, comprising
an input channel for communicating monitored signals from said distributed equipment monitors, including
a first block of distributed, parallel-input register stages connected in series with each other by an input data line and respectively positioned at said equipment monitors for connection to said equipment monitors for receiving in given register stages of the first block from said respective equipment monitors a set of monitored signals that are intended for respective stages of a second block of register stages; and
a second block of register stages connected in series with the first block of register stages by the input data line for receiving said monitored signals in said intended register stages of the second block in series from the respective given register stages of the first block; and
a clock signal generator for generating a clock signal consisting of a series of clock pulses and a frame pulse for defining each frame of the clock signal;
wherein the second block and each stage of the first block are connected to the clock signal generator for receiving the clock signal and are responsive solely to the clock signal for transferring to the respective intended register stages of the second block each set of monitored signals received from the equipment monitors by the respectively positioned given register stages of the first block and for transferring each set of monitored signals from the respective equipment monitors to the stages of the third block.

19. A system according to claim 18, wherein the second block is embodied in a random access memory (RAM).

20. A system according to claim 19, comprising
an address generator connected to the clock signal generator for providing a series of progressive address signals in response to the clock pulses in each frame of the clock signal;
wherein the address generator is connected to the RAM for addressing the stages of the second block with the series of progressive address signals to serially store a said received set of monitored signals transferred from the first block.

21. A system according to claim 18, comprising
a first line connected to each of the stages of the first block for conveying a power signal with the clock signal from the clock signal generator superimposed thereon.

* * * * *